(12) United States Patent
Kabuki et al.

(10) Patent No.: US 8,668,339 B2
(45) Date of Patent: Mar. 11, 2014

(54) LIGHT SOURCE DEVICE

(75) Inventors: Kiyoyuki Kabuki, Hyogo (JP); Akihiko Sugitani, Hyogo (JP); Yoshihiro Horikawa, Hyogo (JP); Yoshio Okazaki, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 128 days.

(21) Appl. No.: 13/445,474

(22) Filed: Apr. 12, 2012

(65) Prior Publication Data

US 2012/0262675 A1 Oct. 18, 2012

(30) Foreign Application Priority Data

Apr. 12, 2011 (JP) .................. 2011-088545

(51) Int. Cl.

| | |
|---|---|
| G03B 21/00 | (2006.01) |
| G03B 21/14 | (2006.01) |
| G03B 21/20 | (2006.01) |
| G03B 21/26 | (2006.01) |
| G02F 1/00 | (2006.01) |
| H04N 5/74 | (2006.01) |
| H05B 37/02 | (2006.01) |
| H05B 39/04 | (2006.01) |
| H05B 41/36 | (2006.01) |
| G02B 27/12 | (2006.01) |
| G02B 27/14 | (2006.01) |

(52) U.S. Cl.
USPC ............... 353/20; 353/33; 353/85; 353/94; 348/750; 315/360; 359/629; 359/639

(58) Field of Classification Search
USPC ........... 353/20, 30–31, 33–34, 37, 82, 84–85, 353/94; 348/744, 750–751, 756–757; 359/485.01, 583, 629, 639; 315/360
See application file for complete search history.

(56) References Cited

U.S. PATENT DOCUMENTS

| | | | | |
|---|---|---|---|---|
| 5,921,650 | A  * | 7/1999  | Doany et al. | 353/31 |
| 6,626,540 | B2 * | 9/2003  | Ouchi et al. | 353/31 |
| 6,726,329 | B2 * | 4/2004  | Li et al. | 353/20 |
| 6,874,890 | B2 * | 4/2005  | Haino et al. | 353/31 |
| 7,044,607 | B2 * | 5/2006  | Ouchi et al. | 353/31 |
| 7,445,341 | B2 * | 11/2008 | Conner | 353/20 |
| 7,553,024 | B2 * | 6/2009  | Ouchi et al. | 353/20 |
| 2009/0086016 | A1 * | 4/2009 | Su | 348/57 |

FOREIGN PATENT DOCUMENTS

JP 3896074 B2 12/2006

* cited by examiner

*Primary Examiner* — Tony Ko
*Assistant Examiner* — Jori S Reilly-Diakun
(74) *Attorney, Agent, or Firm* — Rader, Fishman & Grauer PLLC (57) ABSTRACT

In a light source device, that obtains high light usage efficiency by projecting simultaneously two or more of three primary color lights X, Y and Z. Moreover, each color light X, Y and Z is divided into two in terms of time so that p-wave and s-wave linear polarization lights are formed, such that the synthesized light of the p-wave linear polarization lights enters a first spatial modulation element and the synthesized light of the s-wave linear polarization lights enters a second spatial modulation element to permit gradation control of each color light.

7 Claims, 6 Drawing Sheets

| Frame number | 1 | | | | | | 2 | | | | | |
|---|---|---|---|---|---|---|---|---|---|---|---|---|
| Time division | S1 | S2 | S3 | S4 | S5 | S6 | S1 | S2 | S3 | S4 | S5 | S6 |
| 1st laser source operation | ON | ON | OFF | ON | ON | OFF | ON | ON | OFF | ON | ON | OFF |
| 2nd laser source operation | ON | OFF | ON | ON | OFF | ON | ON | OFF | ON | ON | OFF | ON |
| 3rd laser source operation | OFF | ON | ON | OFF | ON | ON | OFF | ON | ON | OFF | ON | ON |
| 1st retardation P. M. OP. | 13Xp | 13Xp | | | 13Xs | 13Xs | | 13Xp | 13Xp | | | 13Xs |
| 2nd retardation P. M. OP. | 13Ys | | | 13Yp | 13Yp | | 13Ys | | | 13Yp | 13Yp | |
| 3rd retardation P. M. OP. | 132p | | 132s | 132s | | 132p | 132p | | 132s | 132s | | 132p |
| Incident light on 1st S. M. E. | X | X | Y | Y | Z | Z | X | X | Y | Y | Z | Z |
| Incident light on 2nd S. M. E. | Y | Z | Z | X | X | Y | Y | Z | Z | X | X | Y |
| Color light of synthesized C.I. | X,Y | X,Z | Y,Z | X,Y | X,Z | Y,Z | X,Y | X,Z | Y,Z | X,Y | X,Z | Y,Z |

FIG.3

| Frame number | 1 | | | | | | | | 2 | | | | | | | |
|---|---|---|---|---|---|---|---|---|---|---|---|---|---|---|---|---|
| Time division | S1 | S2 | S3 | S4 | S5 | S6 | S7 | S8 | S1 | S2 | S3 | S4 | S5 | S6 | S7 | S8 |
| 1st laser source operation | ON | | | | | | | | | | | | | | | |
| 2nd laser source operation | ON | | | | | | | | | | | | | | | |
| 3rd laser source operation | ON | | | | | | | | | | | | | | | |
| 1st retardation P. M. OP. | 13Xp | | | | 13Xs | | | | 13Xp | | | | 13Xs | | | |
| 2nd retardation P. M. OP. | 13Ys | | | 13Yp | | | | | 13Ys | | | | 13Yp | | | 13Ys |
| 3rd retardation P. M. OP. | 132p | | 132s | | | | 132p | | | | 132s | | | | 132p | |
| Incident light on 1st S. M. E. | XZ | X | XY | Y | YZ | Z | XY | Z | X | XY | Y | YZ | Z | XY | Z | |
| Incident light on 2nd S. M. E. | Y | YZ | Z | XZ | X | XY | Z | XY | YZ | Z | XZ | X | XY | Z | XY | |
| Color light of synthesized C.I. | XZ,Y | X,YZ | XY,Z | XZ,Y | X,YZ | XY,Z | XY,Z | XY,Z | X,YZ | XY,Z | XZ,Y | X,YZ | XY,Z | XY,Z | XY,Z | |

| Frame number | 1 | | | | 2 | | | |
|---|---|---|---|---|---|---|---|---|
| Time division | S1 | S2 | S3 | S4 | S1 | S2 | S3 | S4 |
| Color wheel operation | 83b | 83r | 83g | 83w | 83b | 83r | 83g | 83w |
| Incident light on S. M. E. | blue light | red light | green light | white light | blue light | red light | green light | white light |
| Gradation levels by S. M. E. | 255 | 255 | 255 | 255 | 255 | 255 | 255 | 255 |

FIG. 6
PRIOR ART

LIGHT SOURCE DEVICE

CROSS-REFERENCES TO RELATED APPLICATION

This application claims priority from Japanese Patent Application Serial No. 2011-088545 filed Apr. 12, 2011, the contents of which are incorporated herein by reference in their entirety.

BACKGROUND OF THE INVENTION

The present invention relates to a light source device for a projector, which is installed in a projector apparatus equipped with a spatial modulation element, such as a liquid crystal display device and a digital micromirror device.

In recent years, a projector apparatus equipped with a spatial modulation element, such as a liquid crystal display device and a digital micromirror device, has been developed. One example of a projector apparatus is a color sequential display type projector apparatus in which three primary color lights are formed by dividing, in terms of time, white light emitted from a white light source by a color wheel to display a full color image by irradiating each pixel with the three primary color lights one by one (Japanese Patent No. 3896074).

Figure 5:
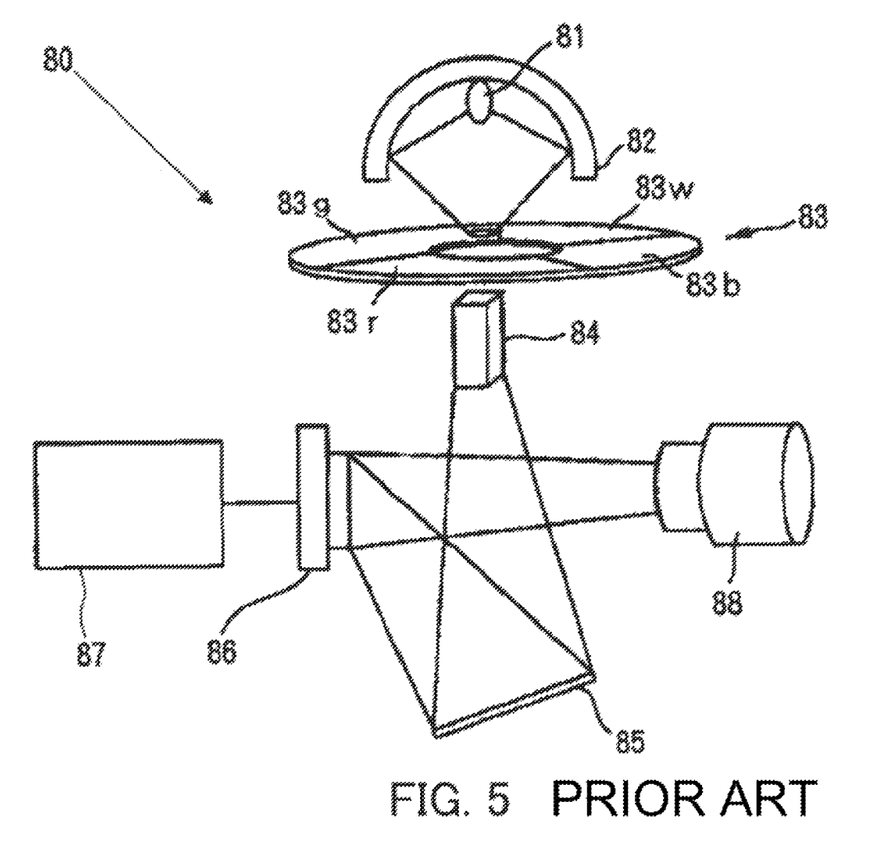
FIG. 5 is an explanatory diagram showing the structure of an example of a color sequential display type projector apparatus.

FIG. 5 is an explanatory diagram showing the structure of an example of a color sequential display type projector apparatus. The projector apparatus 80 comprises a light source lamp 81 that emits white light, an elliptical reflection mirror 82 that condenses the light emitted from light source lamp 81, a color wheel 83, which is driven to rotate, and which divides, in terms of time, the light emitted from the light source lamp 81 to form three primary color lights and white light, a rod integrator 84 for receiving and uniformizing the light that passes through the color wheel 83, a flat reflection mirror 85 that reflects the light emitted from the rod integrator 84, a reflection type spatial modulation element 86 that the light from the flat reflection mirror 85 enters so that a light image is emitted therefrom, a spatial modulation element actuator 87 that drives the spatial modulation element 86, and a projection lens 88 that projects the light image emitted from the spatial modulation element 86 on a screen. The color wheel 83 comprises a filter element 83$b$ that transmits blue light, a filter element 83$r$ that transmits red light, a filter element 83$g$ that transmits green light, and a filter element 83$w$ that transmits white light, wherein these filter elements are respectively in a shape of a partial sector and are arranged to form an annular shape on the same plane.

In such a projector apparatus 80, when the white light emitted from the light source lamp 81 passes through the color wheel 83, the white light is divided into four in terms of time, thereby forming white light and three primary color lights which are blue light, red light, and green light. Then, when these primary color lights and the white light enter the spatial modulation element 86 one by one through the rod integrator 84 and the flat reflection mirror 85, a light image made up of the respective primary color lights and the white light forms. And when the light image is projected sequentially on the screen through the projection lens 88, a desired color image is formed on the screen.

SUMMARY OF THE INVENTION

The present invention relates to a light source device that contains a first color light source unit configured to form and emit a first color division light $X^1$ and a second color division light $X^2$ by dividing a color light X, the first color diving light $X^1$ being a p-wave linear polarization light, the second color diving light $X^2$ being an s-wave linear polarization light, the first color diving light $X^1$ is directed along an optical path xI, and the second color division light $X^2$ is directed along an optical path xII. The light source device also contains a second color light source unit configured to form and emit a first color division light $Y^1$ and a second color division light $Y^2$ by dividing a color light Y, the first color diving light $Y^1$ being a p-wave linear polarization light, the second color diving light $Y^2$ being an s-wave linear polarization light, the first color diving light $Y^1$ is directed along an optical path yI, and the second color division light $Y^2$ is directed along an optical path yII. The light source device further contains a third color light source unit configured to form and emit a first color division light $Z^1$ and a second color division light $Z^2$ by dividing a color light Z, the first color diving light $Z^1$ being a p-wave linear polarization light, the second color diving light $Z^2$ being an s-wave linear polarization light, the first color diving light $Z^1$ is directed along an optical path zI, and the second color division light $Z^2$ is directed along an optical path zII. Additionally, the light source device contains a first color synthesizing optical element configured to synthesize light from the optical path xI, the optical path yI, and the optical path zI into a first synthesized light and emit the first synthesized light; a second color synthesizing optical element configured to synthesize light from the optical path xII, the optical path yII, and the optical path zII into a second synthesized light and emit the second synthesized light; a first spatial modulation element configured to receive the first synthesized light and emit a first light image; a second spatial modulation element configured to receive the second synthesized light and emit a second light image, the second spatial modulation element being driven in conjunction with the first spatial modulation element; an optical image synthesizing mechanism configured to synthesize the first light image and the second light image into a synthesized light image and to emit the synthesized light image; and a synthesized light image projection element configured to project the synthesized light image. Each frame of the synthesized light image is divided into a plurality of time periods and in each of the plurality of time periods two or more of the color light X, the color light Y, and the color light Z are configured to be projected simultaneously.

BRIEF DESCRIPTION OF THE DRAWING

Other features and advantages of the present light source device will be apparent from the ensuing description, taken in conjunction with the accompanying drawings, in which.

DETAILED DESCRIPTION OF THE INVENTION

In view of the above projector apparatus 80 the following was found.

Figure 6:
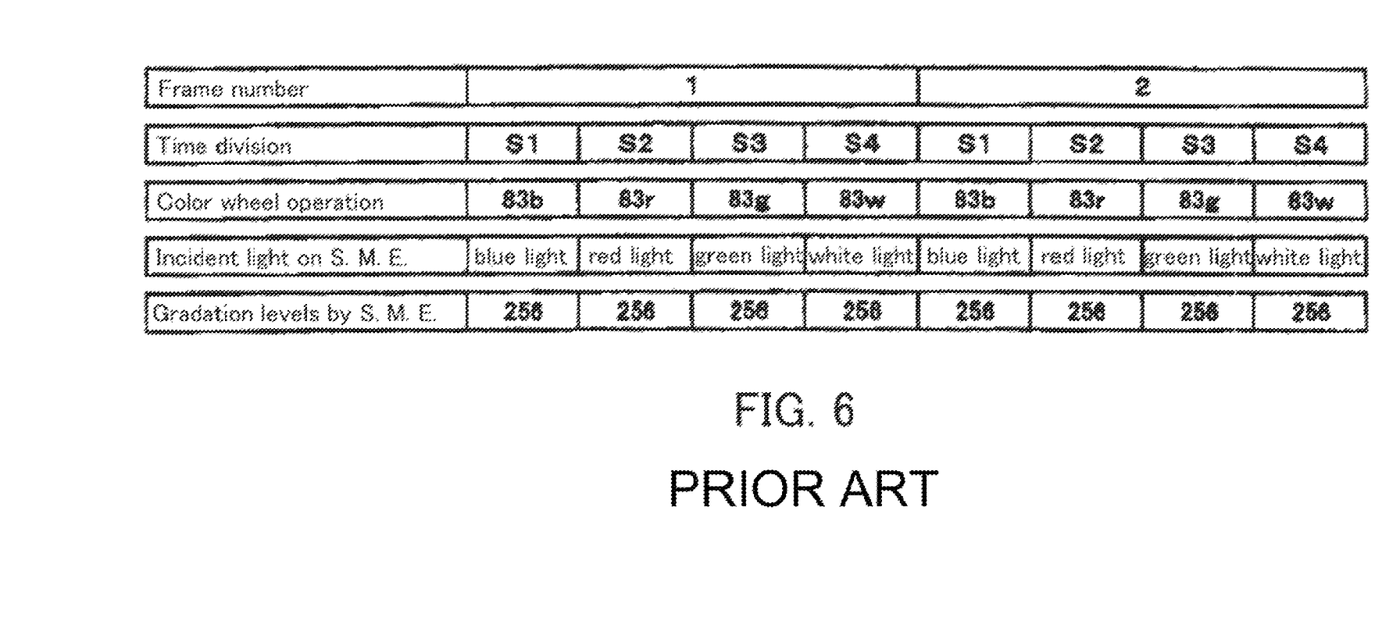
FIG. 6 is a diagram showing an operation relation of a color wheel.

Although the light from the light source lamp 81 is divided, in terms of time, into respective primary color lights and white light by the color wheel 83, the light intensity actually used is, for example, half (½) of the light intensity of light emitted from the light source lamp 81, making the usage efficiency very low. FIG. 6 is a diagram showing an operation relation of a color wheel. Specifically, FIG. 6 is a diagram showing an operation relation of a color wheel, light incident on each spatial modulation element (refer to "Incident light on S.M.E."), and gradation level of spatial modulation element (refer to "Gradation levels by S.M.E.) in a light source device. As shown in FIG. 6, projection time for forming one frame of an image to be displayed, is divided into four time divisions S1-S4 that sequentially continue in terms of time. When the color wheel 83 is operated, for example, blue light enters the space modulation element 86 in the time division S1, red light enters it in the time division S2, green light enters it in the time division S3, and white light enters it in the time division S4. In the time division S4, approximately all color light components emitted from the light source lamp 81 pass through the color wheel 83 and are used (the intensity of light used therein is one quarter (¼) of that in the entire time divisions S1-S4). Although, in the time division S1, blue light among the light components emitted from the light source lamp 81 passes through the color wheel 83 and is used, the other color light components are wasted (the intensity of light used therein is ¹⁄₁₂ of that in the entire time divisions S1-S4). Further, although, in the time division S2, red light among the light components emitted from the light source lamp 81 passes through the color wheel 83 and is used, the other color light components are wasted (the intensity light used therein is ¹⁄₁₂ of that in the entire time divisions S1-S4). Furthermore, although, in the time division S3, green light among light components emitted from the light source lamp 81 passes through the color wheel 83 and is used, the other color light components are wasted (the intensity of light used therein is ¹⁄₁₂ of that in the entire time divisions S1-S4). Thus, in the above projector apparatus 80, the usage efficiency of light is extremely low, that is, as low as ½ (¼+¹⁄₁₂+¹⁄₁₂+¹⁄₁₂), and it is difficult to configure the structure of a projector apparatus capable of obtaining high illuminance with low electric power.

Generally, in such a projector apparatus, the brightness of each primary color light is controlled by changing the reflex time of the light (transmission time in case a transmission type space modulation element is used) with respect to a space modulation element, wherein the number of gradation levels of each primary color light is 256 (8 bits), so that it becomes possible to reproduce color with gradation levels of the third power of 256 (16,777,216). To realize higher color reproduction, an increase of the number of gradation levels of each primary color light is further required. However, it is difficult to increase the number of gradation levels because of the response speed limitations of the space modulation element 86 in the above projector apparatus. That is, in such a projector apparatus, projection time for forming one frame of an image to be displayed is, for example, ¹⁄₆₀ second (60 frames per second). And, since, to realize the 256 gradation levels in each primary color light, it is required that the space modulation color lights are projected within the projection time of a frame, the response time required for the space modulation element 86 is 1/(60×4×256) second (16.2 microseconds). And since the response speed thereof is approximately 15 microseconds even when a digital micromirror device is used as the space modulation element 86, the number of gradation levels cannot be increased. Thus, higher color reproduction is not achieved.

In view of the above, the present invention offers a light source device for a projector with high light usage efficiency and high color reproduction.

In a light source device for a projector according to the present invention, one of red, green, and blue light is represented as color light X, another as color light Y, and the remaining one as color light Z. A light source device, comprising a first light source unit that divides a first light (X) in terms of time to produce a first division light ($X^1$), which is p-wave linear polarization light, and a second division light ($X^2$), which is s-wave linear polarization light, in accordance with separate optical paths to emit the first and second division light; a second light source unit that divides a second light (Y) in terms of time to produce a third division light ($Y^1$), which is p-wave linear polarization light, and a fourth division light ($Y^2$), which is s-wave linear polarization light, in accordance with separate optical paths to emit the third and fourth division light; a third light source unit that divides a third light (Z) in terms of time to produce a fifth division light ($Z^1$), which is p-wave linear polarization light, and a sixth division light ($Z^2$), which is s-wave linear polarization light, in accordance with separate optical paths to emit the fifth and sixth division light; a first synthesizing optical element arranged at an intersection of the optical paths of the first, third, and fifth division light; a second synthesizing optical element arranged at an intersection of the optical paths of the second, fourth, and sixth division light; a first spatial modulation element that emits a first light image based on a received synthesized light from the first synthesizing optical element; a second spatial modulation element driven in conjunction with the first spatial modulation element that emits a second light image based on a received synthesized light from the second color synthesizing optical element; an optical image synthesizing mechanism that synthesizes the first light image and the second light image; and a synthesized light image projection element that projects the synthesized light image from the optical image synthesizing mechanism, wherein the first light is one of a red light, a green light, and a blue light, wherein the second light is one of the red light, the green light, and the blue light and is not the same as the first light, wherein the third light is one of the red light, the green light, and the blue light and is not the same as the first light and second light, and wherein in each of divisions, which sequentially continue in terms of time in each frame of an image, two or more of the first, the second, and third light can be projected simultaneously.

Embodiments of a light source device for a projector according to the present invention will be described below.

First Embodiment

Figure 1:
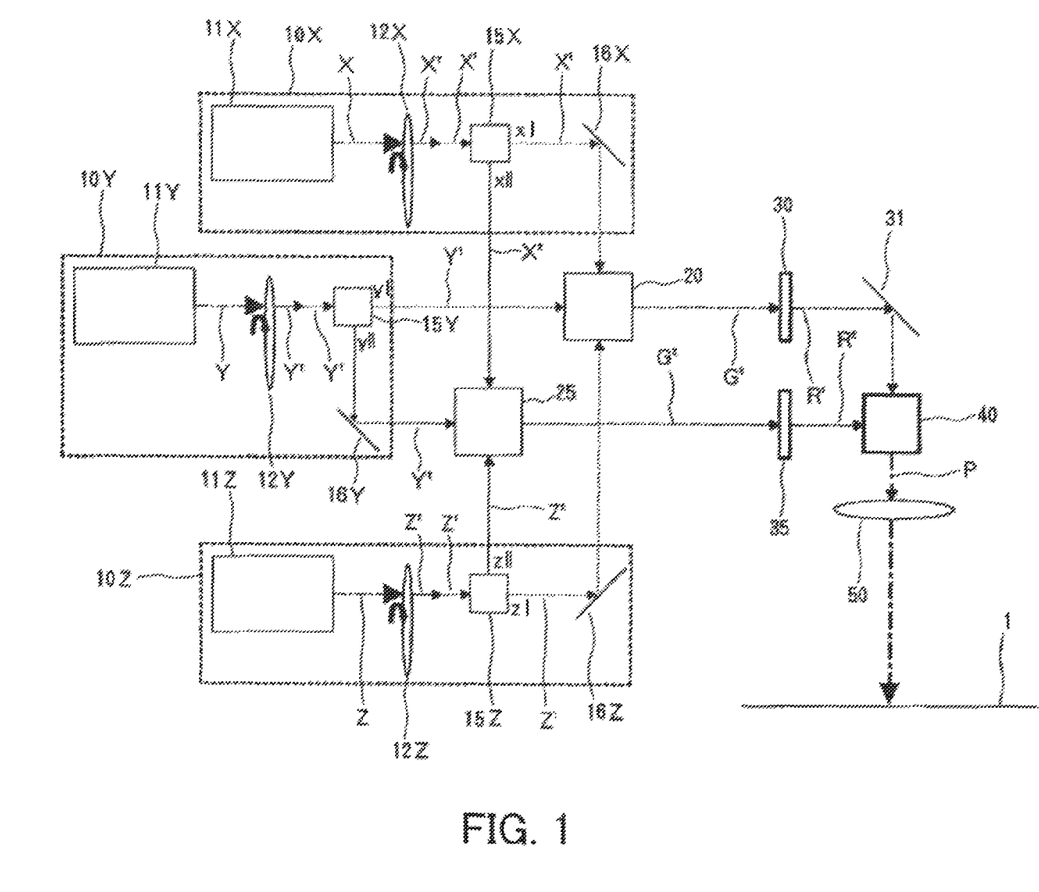
FIG. 1 is an explanatory diagram showing the structure of an example of a light source device for a projector.

FIG. 1 is an explanatory diagram showing the structure of an example of a light source device for a projector. The light source device for a projector comprises a first color light source unit 10X for emitting a first division color light $X^1$, which is p-wave linear polarization light, and for emitting a second division color light $X^2$, which is s-wave linear polarization light. The first and second division color lights $X^1$ and $X^2$ are formed by dividing color light X into two in terms of time. The projector further comprises a second color light source unit 10Y for emitting a first division color light $Y^1$, which is p-wave linear polarization light, and for emitting a second division color light $Y^2$, which is s-wave linear polarization light. The first and second division color lights $Y^1$ and $Y^2$ are formed by dividing color light Y into two in terms of time. The projector further comprises a third color light source unit 10Z for emitting a first division color light $Z^1$, which is p-wave linear polarization light and for emitting a second division color light $Z^2$, which is s-wave linear polarization light. The first division color lights $Z^1$ and $Z^2$ are formed by dividing color light Z into two in terms of time. Here, the color lights X, Y, and Z are different primary color lights. That is, one is a red light, another is a green light, and the remaining is a blue light.

The first color light source unit 10X comprises a first laser light source 11X, which emits color light X (for example red light); a first retardation plate mechanism 12X, which forms the first division color light $X^1$ and the second division color light $X^2$ by dividing the color light X emitted from the first laser light source 11X, into two in terms of time; a polarization beam splitter 15X for switching and emitting the first division color light $X^1$ and the second division color light $X^2$, which are emitted from the first retardation plate mechanism 12X, to the respective optical paths xI and xII; and a light reflector 16X that reflects the first division color light $X^1$ emitted from the polarization beam splitter 15X. The second color light source unit 10Y comprises a second laser light source, which emits color light Y (for example green light); a second retardation plate mechanism which forms the first division color light $Y^1$ and the second division color light $Y^2$ by dividing the color light Y emitted from the second laser light source 11Y, into two in terms of time; a polarization beam splitter 15Y for switching and emitting the first division color light $Y^1$ and the second division color light $Y^2$, which are emitted from the second retardation plate mechanism 12Y, to the respective optical paths yI and yII; and a light reflector 16Y that reflects the second division color light $Y^2$ emitted from the polarization beam splitter 15Y. The third color light source unit 10Z comprises a third laser light source, which emits color light Z (for example, blue light); a third retardation plate mechanism 12Z which forms the first division color light $Z^1$ and second division color light $Z^2$ by dividing the color light Z from the third laser light source 11Z, into two in terms of time; a polarization beam splitter 15Z for switching and emitting the first division color light $Z^1$ and the second division color light $Z^2$, which are emitted from the third retardation plate mechanism 12Z, to optical paths zI and zII; and a light reflector plate 16Z that reflects the first division color light $Z^1$ from the polarization beam splitter 15Z.

For example, laser light sources for emitting p-wave linear polarization light are respectively used for the first laser light source 11X, the second laser light source 11Y, and the third laser light source 11Z. Semiconductor laser and the like can be used as a laser system, which forms each of the first laser light source 11X, the second laser light source 11Y, and the third laser light source 11Z.

Figure 2A:
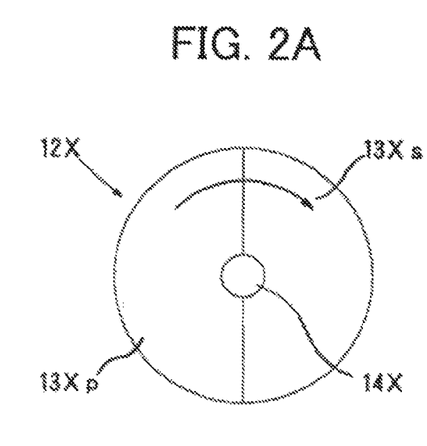
FIGS. 2A, 2B, and 2C are respectively plan views of a first retardation plate mechanism, a second retardation plate mechanism, and a third retardation plate mechanism.
Figure 2B:
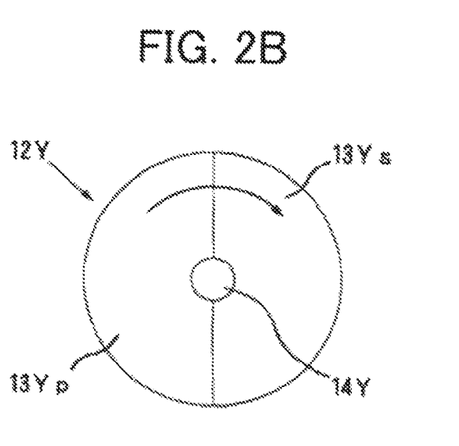
Figure 2C:
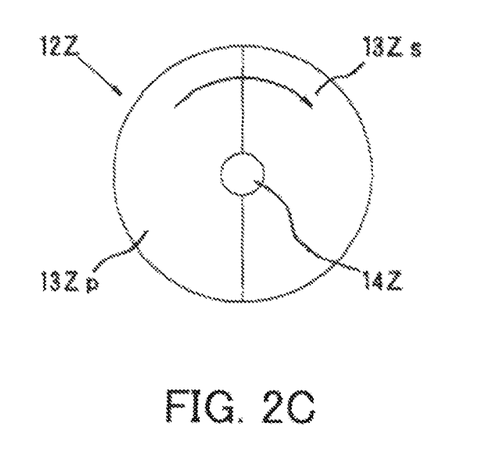

FIGS. 2A, 2B, and 2C are respectively plan views of a first retardation plate mechanism, a second retardation plate mechanism, and a third retardation plate mechanism. As shown in FIG. 2A, the first retardation plate mechanism 12X is configured so that two retardation plate elements 13Xp and 13Xs, which are approximately semicircular, may be arranged to surround a rotational axis 14X. A phase difference of one of the retardation plate elements (13Xp) is 0 degrees, and a phase difference of the other retardation plate element 13Xs is 180 degrees. When the first retardation plate mechanism 12X is driven to rotate in a direction of an arrow shown in FIG. 2A, the two retardation plate elements 13Xp and 13Xs are controlled to alternately pass through the optical path of the color light X emitted from the first laser light source 11X. As shown in FIG. 2B, the second retardation plate mechanism 12Y is configured so that two retardation plate elements 13Yp and 13Ys, which are approximately semicircular, may be arranged to surround a rotational axis 14Y thereof. A phase difference of one of the retardation plate elements (13Yp) is 0 degrees, and a phase difference of the other retardation plate element 13Ys is 180 degrees. When the second retardation plate mechanism 12Y is driven to rotate in a direction of an arrow shown in FIG. 2B, the two retardation plate elements 13Yp and 13Ys are controlled to alternately pass through the optical path of the color light Y emitted from the second laser light source 11Y. The third retardation plate mechanism 12Z is configured so that two retardation plate elements 13Zp and 13Zs, which are approximately semicircular, may be arranged to surround the rotational axis 14Z. The phase difference of one of the retardation plate element 13Zp is 0 degrees, and the phase difference of the other retardation plate element 13Zs is 180 degrees. When the third retardation plate mechanism 12Z is driven to rotate in a direction of an arrow shown in FIG. 2C, the two retardation plate elements 13Zp and 13Zs are controlled to alternately pass through the optical path of the color light Z emitted from the third laser light source 11Z.

In the first color light source unit 10X, the second color light source unit 10Y, and the third color light source unit 10Z, the polarization beam splitters 15X, 15Y, and 15Z respectively transmit specific linear polarization light and reflect linear polarization light, which is different from the specific linear polarization light. In the example shown in the drawings, the polarization beam splitter 15X in the first color light source unit 10X transmits the first division color light $X^1$, which is p-wave linear polarization light from the first retardation plate mechanism 12X, and reflects the second division color light $X^2$, which is s-wave linear polarization light from the first retardation plate mechanism 12X by, for example, 90 degrees, whereby the first division color light $X^1$ and the second division color light $X^2$ are switched and alternately emitted to the respective optical paths xI and xII, which are different from each other. In addition, the polarization beam splitter 15Y in the second color light source unit 10Y transmits the first division color light $Y^1$, which is p-wave linear polarization light from the second retardation plate mechanism 12Y, and reflects the second division color light $Y^2$, which is s-wave linear polarization light from the second retardation plate mechanism 12Y by, for example, 90 degrees, whereby the first division color light $Y^1$ and the second division color light $Y^2$ are switched and alternately emitted to the respective optical paths yI and yII, which are different from each other. In addition, the polarization beam splitter 15Z in the third color light source unit 10Z transmits the first division color light $Z^1$, which is p-wave linear polarization light from the third retardation plate mechanism 12Z, and reflects the second division color light $Z^2$, which is s-wave linear polarization light from the third retardation plate mechanism 12Z by, for example, 90 degrees, whereby the first division color light $Z^1$ and the second division color light $Z^2$ are switched and alternately emitted to the respective optical paths zI and zII, which are different from each other.

A first color synthesizing optical element 20 is arranged at an intersection of the optical path xI of the first division color light $X^1$ from the first color light light source unit 10X, the optical path yI of the first division color light $Y^1$ from the second color light light source unit 10Y, and the optical path zI of the first division color light $Z^1$ from the third color light light source unit 10Z, wherein the first color synthesizing optical element 20 synthesizes the first division color light $X^1$, the first division color light $Y^1$, and the first division color light $Z^1$, thereby emitting first synthesized light $G^1$. A second color synthesizing optical element 25 is arranged at an intersection of the optical path xII of the second division color light $X^2$ from the first color light light source unit 10X, the optical path yII of the second division color light $Y^2$ from the second color light light source unit 10Y, and the optical path zII of the second division color light $Z^2$ from the third color light light source unit 10Z, wherein the first color synthesizing optical element 25 synthesizes the second division color light $X^2$, the second division color light $Y^2$, and the second division color light $Z^2$, thereby emitting second synthesized light $G^2$. A color synthesis prism such as a dichroic prism can be used as the first color synthesizing optical element 20 or the second color synthesizing optical element 25.

A transmission type first spatial modulation element 30, on which the first synthesized light $G^1$ is incident and that emits a first light image $R^1$ is arranged on the optical path of the first synthesized light $G^1$ emitted from the first color synthesizing optical element 20. And a transmission type second spatial modulation element 35 on which the second synthesized light $G^2$ is incident and that emits a second light image $R^2$ is arranged on the optical path of the second synthesized light $G^2$ emitted from the second color synthesizing optical element 20. Here, the second spatial modulation element 35 is driven in relation to the first spatial modulation element 30.

Moreover, an optical image synthesizing mechanism 40, which is made up of a polarization beam splitter, that synthesizes the first light image $R^1$ and the second light image $R^2$ to form a synthesized light image P is arranged at an intersection of the optical path of the first light image $R^1$ from the first spatial modulation element 30 and the optical path of the second light image $R^2$ from the second spatial modulation element 35. A synthesized light image projection element 50, which enlarges and projects the synthesized light image P on a screen 1, that is made up of a projection lens is arranged on an optical path of the synthesized light image P from the optical image synthesizing mechanism 40.

Since the number of gradation levels of each of the color light X, the color light Y, and the color light Z can be set to be large in the first spatial modulation element 30 and the second spatial modulation element 35, it is desirable that a modulation element whose response speed is 20 μsec (microseconds) or less be used. For example, a Digital Micromirror Device (DMD), a liquid crystal display device, etc. may be used as the first spatial modulation element 30 and the second spatial modulation element 35.

The polarization beam splitter, which forms the optical image synthesizing mechanism 40, transmits specific linear polarization light, and reflects linear polarization light, whose kind is different from that of the specific linear polarization light. In an example shown in the drawings, while the optical image synthesizing mechanism 40 transmits p-wave linear polarization light relating to the first light image $R^1$, which enters the optical image synthesizing mechanism 40 through the light reflector 31 from the first spatial modulation element 30, the synthesized light image P is formed by reflecting, by 90 degrees, s-wave linear polarization light relating to the second light image $R^2$ which enters the optical image synthesizing mechanism 40, from a direction perpendicular to the first light image $R^1$, from the second spatial modulation element 35.

In the abovementioned light source device for a projector, two or three of the color light X, the color light Y, and the color light Z can be simultaneously projected in each of the divisions, which sequentially continue in terms of time, in each frame of a displayed image. An operation of the above mentioned light source device for a projector in case where two of the color light X, the color light Y, and the color light Z are simultaneously projected, and an operation in case where three of the color lights are simultaneously projected, will be described below.

Simultaneous Projection of Two Color Lights

Figure 3:
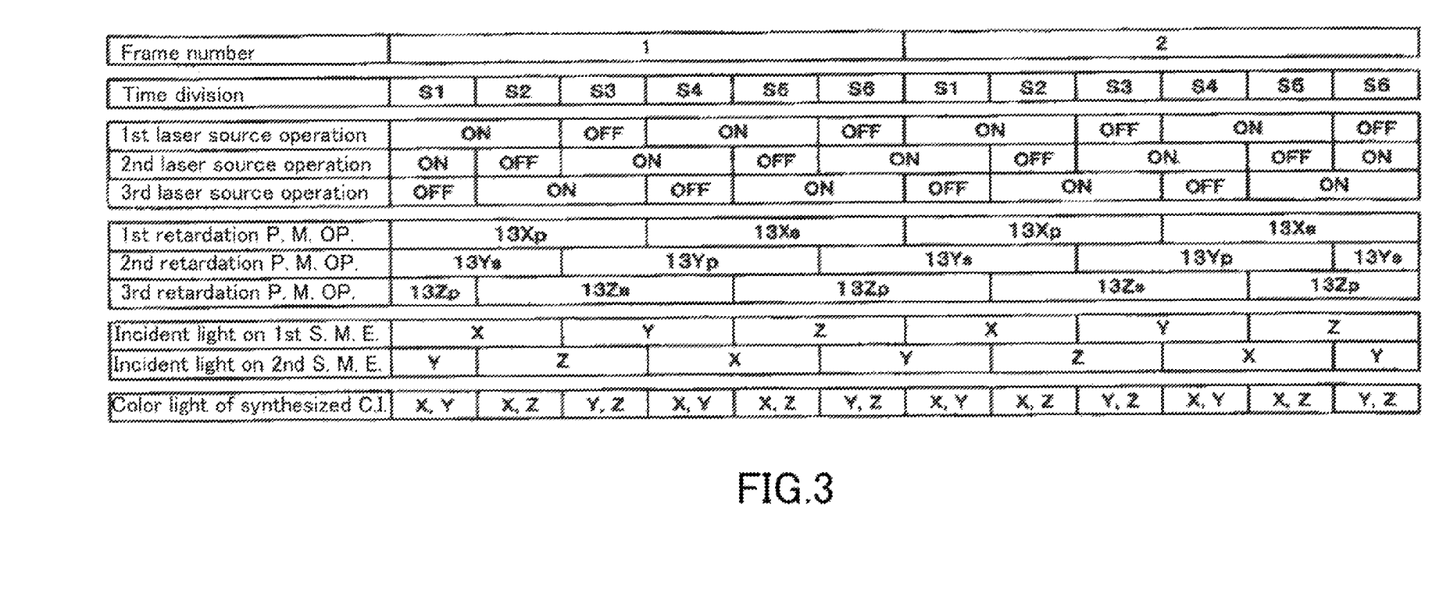
FIG. 3 is a diagram showing an example of an operation relation between each laser light source unit, each retardation plate mechanism, a light incident on each spatial modulation element, and a color light of a synthesized light image, in a light source device for the projector shown in FIG. 1, where two of color lights X, Y, and Z, are simultaneously projected.

FIG. 3 is a diagram showing an example of an operation relation between each laser light source unit, each retardation plate mechanism, a light incident on each spatial modulation element, and a color light of a synthesized light image, in a light source device for the projector shown in FIG. 1, where two of color lights X, Y, and Z, are simultaneously projected. Specifically, FIG. 3 is a diagram showing an example of relation of an operation of each laser light source unit, an operation of each retardation plate mechanism (refer to "$1^{st}$ through $3^{rd}$ retardation P. M. OP.), light incident on each spatial modulation element (refer to "Incident light on $1^{st}$ S. M. E." and "Incident light on $2^{nd}$ S. M. E") and color light of a synthesized light image (refer to "Color light of synthesized C. I."), in the light source device for a projector shown in FIG. 1, where two of color light X, color light Y, and color light Z are simultaneously projected. In this example, projection time of one frame of an image to be displayed is divided into six time divisions (S1-S6), which sequentially continue in terms of time, and under this condition, the light source device for a projector is operated.

In the first color light source unit 10X, an operation of the first laser light source 11X is, in the first, second, fourth, and fifth time divisions (S1, S2, S4, and S5), in an ON (active) state where the color light X is emitted, and is in an OFF (inactive) state in the third and sixth time divisions (S3 and S6). On the other hand, while, in the first retardation plate mechanism 12X, the retardation plate element 13Xp passes through the optical path of the color light X emitted from the first laser light source 11X in the time divisions S1-S3, the retardation plate element 13Xs passes through the optical path of the color light X emitted from the first laser light source 11X in the time divisions S4-S6. As a result, the first color light source unit 10X forms the first division color light $X^1$ in the time divisions S1 and S2 so as to emit it along the optical path xI, is not operated in the time division S3, forms the second division color light $X^2$ in the time divisions S4 and S5 so as to emit it along the optical path xII, and is not operated in the time division S6.

In the second color light source unit 10Y, the operation of the second laser light source 11Y is, in the time divisions S1, S3, S4 and S6, in an ON (active) state where color light Y is emitted, and is in an OFF (inactive) state in the time divisions S2 and S5. On the other hand, while, in the second retardation plate mechanism 12Y, the retardation plate element 13Yp passes through the optical path of the color light Y emitted from the second laser light source 11Y in the time divisions S3-S5, the retardation plate element 13Ys passes through the optical path of the color light Y emitted from the second laser light source 11Y in the time divisions S1, S2 and S6. As a result, the second color light source unit 10Y forms the second division color light $Y^2$ in the time division S1 so as to emit it along the optical path yII, is not operated in the time division S2, and forms the first division color light $Y^1$ in the time divisions S3 and S4 so as to emit it along the optical path yI, is not operated in the time division S5, and further forms the second division color light $Y^2$ in the time division S6 so as to emit it along the optical path yII.

In the third color light source unit 10Z, the operation of the third laser light source 11Z is, in the time divisions S2, S3, S5 and S6, in an ON (active) state where color light Z is emitted, and is in an OFF (inactive) state in the time divisions S1 and S4. On the other hand, while, in the third retardation plate mechanism 12Z, the retardation plate element 13Zp passes through the optical path of the color light Z emitted from the third laser light source 11Z in the time divisions S1, S5 and S6, the retardation plate element 13Zs passes through the optical path of the color light Z emitted from the third laser light source 11Z in the time divisions S2-S4. The third color light source unit 10Z is not operated in the time division S1, forms the second division color light $Z^2$ in the time divisions S2 and S3 so as to emit it along the optical path zII and is not operated in the time division S4, and forms the first division color light $Z^1$ in the time divisions S5 and S6 so as to emit it along the optical path zI.

Moreover, when the first division color light $X^1$, the first division color light $Y^1$, and the first division color light $Z^1$ are synthesized in the first color synthesizing optical element 20, the first synthesized light $G^1$ is emitted from the first color synthesizing optical element 20 and enters the first spatial modulation element 30. When the light (first synthesized light $G^1$), which is incident on the first spatial modulation element 30, is divided based on the time divisions S1-S6, the incident light in the time divisions S1 and S2 is the color light X, the incident light in the time divisions S3 and S4 is the color light Y, and the incident light in the time divisions S5 and S6 is the color light Z. On the other hand, when the second division color light $X^2$, the second division color light $Y^2$, and the second division color light $Z^2$ are synthesized in the second color synthesizing optical element 25, the second synthesized light $G^2$ is emitted from the second color synthesizing optical element 25 and enters the second spatial modulation element 35. When the light (second synthesized light $G^2$), which is incident on the second spatial modulation element 35, is divided based on the time divisions S1-S6, the incident light in the time division S1 is the color light Y, the incident light thereon in the time divisions S2 and S3 is the color light Z, the incident light in the time divisions S4 and S5 is the color light X, and the incident light in the time division S6 is the color light Y.

And when the first light image $R^1$ from the first spatial modulation element 30 and the second light image $R^2$ from the second spatial modulation element 35 are synthesized in the optical image synthesizing mechanism 40, the synthesized light image P is emitted from the optical image synthesizing mechanism 40 and then enlarged by the synthesized light image projection element 50, to be projected on a screen 1. When this synthesized light image P is divided based on the time divisions S1-S6, the color lights in the time divisions S1 and S4 are the color light X and the color light Y, the color lights in the time division S2 and S5 are the color light X and the color light Z, and the color lights in the time division S3 and S6 are the color light Y and the color light Z. As mentioned above, in each of the six time divisions S1-S6, which are sequentially continuous in terms of time, in each frame of an image to be displayed, two of the color light X, the color light Y, and the color light Z are simultaneously projected.

Moreover, in each of the first spatial modulation element 30 and the second spatial modulation element 35, the number of gradation levels can be set to 128 in each of the time divisions S1-S6. Therefore, the number of gradation levels of the color light X is 512, which is a sum of 256 gradation levels in the time divisions S1 and S2 by the first spatial modulation element 30, and 256 gradation levels in the time divisions S4 and S5 by the second spatial modulation element 35. Moreover, the number of gradation levels of the color light Y is 512, which is a sum of 256 gradation levels in the time divisions S3 and S4 by the first spatial modulation element 30, and 256 gradation levels in the time divisions S1 and S6 by the second spatial modulation element 35. Moreover, the number of gradation levels of the color light Z is 512, which is a sum of 256 gradation levels in the time divisions S5 and S6 by the first spatial modulation element 30, and 256 gradation levels in the time divisions S2 and S3 by the second spatial modulation element 35.

Simultaneous Projection of Three Color Lights

Figure 4:
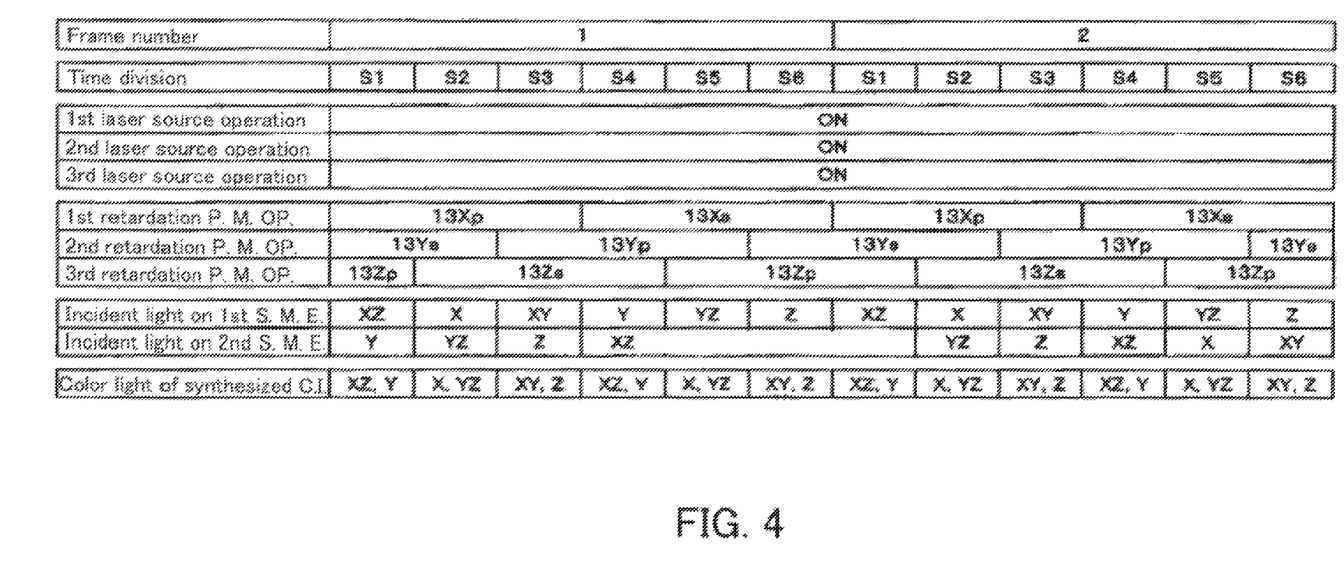
FIG. 4 is a diagram showing an example of an operation relation between each laser light source unit, each retardation plate mechanism, a light incident on each spatial modulation element, and the color light of a synthesized light image, in a light source device for the projector shown in FIG. 1, where three color lights X, Y, and Z, are simultaneously projected.

FIG. 4 is a diagram showing an example of an operation relation between each laser light source unit, each retardation plate mechanism, a light incident on each spatial modulation element, and the color light of a synthesized light image, in a light source device for the projector shown in FIG. 1, where three color lights X, Y, and Z, are simultaneously projected. Specifically, FIG. 4 is a diagram showing an example of relation of an operation of each laser light source unit, an operation of each retardation plate mechanism (refer to "$1^{st}$ through $3^{rd}$ retardation P. M. OP."), light incident on each spatial modulation element (refer to "Incident light on $1^{st}$ S. M. E." and "Incident light on $2^{nd}$ S. M. E") and color light of a synthesized light image (refer to "Color light of synthesized C. I."), in the light source device for a projector shown in FIG. 1, in case where three color lights, that is, color light X, color light Y, and color light Z, are simultaneously projected. In this example, projection time of one frame of an image to be displayed is divided into six time divisions S1-S6, which sequentially continue in terms of time, and under this condition, the light source device for a projector is operated.

In the first color light source unit 10X, in all the time divisions S1-S6, an operation of the first laser light source 11X is in an ON (active) state where the color light X is emitted. On the other hand, while, in the first retardation plate mechanism 12X, the retardation plate element 13Xp passes through the optical path of the color light X emitted from the first laser light source 11X in the time divisions S1-S3, the retardation plate element 13Xs passes through the optical path of the color light X emitted from the first laser light source 11X in the time divisions S4-S6. As a result, the first color light source unit 10X forms the first division color light $X^1$ in the time divisions S1-S3 to emit it along the optical path xI and forms the second division color light $X^2$ in the time divisions S4-S6 to emit it along the optical path xII.

In the second color light source unit 10Y, in all the time divisions S1-S6, an operation of the second laser light source 11Y is in an ON (active) state where the color light Y is emitted. On the other hand, while, in the second retardation plate mechanism 12Y, the retardation plate element 13Yp passes through the optical path of the color light Y emitted from the second laser light source 11Y in the time divisions S3-S5, the retardation plate element 13Ys passes through the optical path of the color light Y emitted from the second laser light source 11Y in the time divisions S1, S2 and S6. The second color light source unit 10Y forms the first division color light $Y^2$ in the time divisions S1 and S2 to emit it along the optical path yII and forms the first division color light $Y^1$ in the time divisions S3-S5 to emit it along the optical path yI, and further forms the second division color light $Y^2$ in the time division S6 to emit it along the optical path yII.

In the third color light source unit 10Z, in all the time divisions S1-S6, an operation of the third laser light source 11Z is in an ON (active) state where the color light Z is emitted. On the other hand, while, in the third retardation plate mechanism 12Z, the retardation plate element 13Zp passes through the optical path of the color light Z emitted from the third laser light source 11Z in the time divisions S1, S5 and S6, the retardation plate element 13Zs passes through the optical path of the color light Z from the third laser light source 11Z in the time divisions S2-S4. The third color light source unit 10Z forms the first division color light $Z^1$ in the time division S1 to emit it along the optical path zI and forms the second division color light $Z^2$ in the time divisions S2-S4 to emit it along the optical path zII, and further forms the first division color light $Z^1$ in the time divisions S5 and S6 so as to emit it along the optical path zI.

Moreover, when the first division color light $X^1$, the first division color light $Y^1$, and the first division color light $Z^1$ are synthesized in the first color synthesizing optical element 20, the first synthesized light $G^1$ is emitted from the first color synthesizing optical element 20 and enters the first spatial modulation element 30. When the light (first synthesized light $G^1$), which is incident on the first spatial modulation element 30, is divided based on time divisions S1-S6, the incident light thereon in the time division S1 is a mixed light XZ of the color light X and the color light Z, the incident light in the time division S2 is the color light X, the incident light in the time division S3 is a mixed light XY of the color light X and the color light Y, the incident light in the time division S4 is the color light Y, the incident light in the time division S5 is a mixed light YZ of the color light Y and the color light Z, and the incident light in the time division S6 is the color light Z. On the other hand, when the second division color light $X^2$, the second division color light $Y^2$, and the second division color light $Z^2$ are synthesized in the second color synthesizing optical element 25, the second synthesized light $G^2$ is emitted from the second color synthesizing optical element 25 and enters the second spatial modulation element 35. When the light (first synthesized light $G^1$), which is incident on the second spatial modulation element 35, is divided based on time divisions S1-S6, the incident light in the time division S1 is the color light Y, the incident light in the time division S2 is a mixed light YZ of the color light Y and the color light Z, the incident light in the time division S3 is the color light Z, the incident light in the time division S4 is a mixed light XZ of the color light X and the color light Z, the incident light in the time division S5 is the color light X, and the incident light in the time division S6 is a mixed light XY of the color light X and the color light Y.

And when the first light image $R^1$ from the first spatial modulation element 30 and the second light image $R^2$ from the second spatial modulation element 35 are synthesized in the optical image synthesizing mechanism 40, the synthesized light image P is emitted from the optical image synthesizing mechanism 40 and then enlarged by the synthesized light image projection element 50, to be projected on the screen 1. When this synthesized light image P is divided based on the time divisions S1-S6, color lights are made up of the color light X, the color light Y and the color light Z in each of the time divisions S1-S6. As mentioned above, in each of the six time divisions S1-S6, which sequentially continue in terms of time, in each frame of a displayed image, three color lights, that is, the color light X, the color light Y, and the color light Z, are simultaneously projected.

Moreover, in each of the first spatial modulation element 30 and the second spatial modulation element 35, the number of gradation levels can be set to 128 in each of the time divisions S1-S6. Therefore, the number of gradation levels of the color light X is 256, which is a sum of 128 gradation levels in the time division S2 by the first spatial modulation element 30, and 128 gradation levels in the time division S5 by the second spatial modulation element 35. However, while gradation of the mixed light XZ can be set (to 128 gradation levels) in the time division S1 and that of the mixed light XY can be set (to 128 gradation levels) in the time division S3, by the first spatial modulation element 30, gradation of the mixed light XZ can be set (to 128 gradation levels) in the time division S4 and gradation of the mixed light XY can be set (to 128 gradation levels) in the time division S6, so that the gradation levels of the color light X is set to 768 substantially. The number of gradation levels of the color light Y is 256, which is a sum of 128 gradation levels in the time division S4 by the first spatial modulation element 30, and 128 gradation levels in the time division S1 by the second spatial modulation element 35. However, while gradation of the mixed light XY can be set (to 128 gradation levels) in the time division S3 and gradation of the mixed light YZ can be set (to 128 gradation levels) in the time division S5 by the first spatial modulation element 30, gradation of the mixed light YZ can be set (to 128 gradation levels) in the time division S2 and gradation of the mixed light XY can be set (to 128 gradation levels) in the time division S6, so that the gradation levels of the color light Y is set to 768 substantially. In addition, the number of gradation levels of the color light Z is 256, which is a sum of 128 gradation levels in the time division S6 by the first spatial modulation element 30, and 128 gradation levels in the time division S3 by the second spatial modulation element 35. However, while gradation of the mixed light XZ can be set (to 128 gradation levels) in the time division S1 and gradation of the mixed light YZ can be set (to 128 gradation levels) in the time division S5 by the first spatial modulation element 30, gradation of the mixed light YZ can be set (to 128 gradation levels) in the time division S2 and gradation of the mixed light XZ can be set (to 128 gradation levels) in the time division S4, by the second spatial modulation element 35, so that the gradation levels of the color light Z is set to 768 substantially.

According to the above-mentioned light source device for a projector, since in each of the six time divisions S1-S6, which sequentially continue in terms of time, in each frame of the displayed image, two or more of the color light X, the color light Y and the color light Z, which are three primary color lights, can be projected simultaneously, the high light usage efficiency can be obtained. Moreover, in the first color light source 10X, the second color light source 10Y and the third color light source 10Z, each of the color light X, the color light Y, and the color light Z is divided into two in terms of time, and division color light that is p-wave linear polarization light and division color light that is s-wave linear polarization light are respectively formed, wherein while the first synthesized light $G^1$ formed by synthesizing the respective division color lights that are p-wave linear polarization lights, enters the first spatial modulation element 30, the second synthesized light $G^2$ formed by synthesizing the respective division color lights that are s-wave linear polarization light, enters the second spatial modulation element 35. Therefore, since in each of the first spatial modulation element 30 and the second spatial modulation element 35, it becomes possible to control gradation of each color light so that the gradation levels of each color light can be increased substantially, whereby an image, which has high color reproduction, can be obtained by synthesizing the first light image $R^1$ from the first spatial modulation element 30 and the second light image $R^2$ from the second spatial modulation element 35.

Although the embodiments of the present invention are described above, the present invention is not limited thereto and various modifications can be made thereto. For example, as long as the color light X, the color light Y, and the color light Z are primary color lights, which are different from one another, the color light X may be green light or blue light, and the color light Y may be blue light or red light, and the color light Z may be red light or green light. Moreover, the number of the time divisions, which sequentially continue in terms of time, in each frame of an image to be displayed, is not limited to six, but the number thereof may be suitably selected. Moreover, although three laser light sources, that is, the first laser light source 11X, the second laser light source 11Y, and the third laser light source 11Z, are used in the above-described embodiments as means for obtaining the color light X, the color light Y, and the color light Z, the color light X, the color light Y, and the color light Z may be formed from white light emitted from a single white light source by using spectrum optical elements such as dichroic mirrors.

The preceding description has been presented only to illustrate and describe exemplary embodiments of the present light source device. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A light source device, comprising:
    a first color light source unit configured to form and emit a first color division light $X^1$ and a second color division light $X^2$ by dividing a color light X, the first color division light $X^1$ being a p-wave linear polarization light, the second color division light $X^2$ being an s-wave linear polarization light, the first color division light $X^1$ is directed along an optical path xI, and the second color division light $X^2$ is directed along an optical path xII;
    a second color light source unit configured to form and emit a first color division light $Y^1$ and a second color division light $Y^2$ by dividing a color light Y, the first color division light $Y^1$ being a p-wave linear polarization light, the second color division light $Y^2$ being an s-wave linear polarization light, the first color division light $Y^1$ is directed along an optical path yI, and the second color division light $Y^2$ is directed along an optical path yII;
    a third color light source unit configured to form and emit a first color division light $Z^1$ and a second color division light $Z^2$ by dividing a color light Z, the first color division light $Z^1$ being a p-wave linear polarization light, the second color division light $Z^2$ being an s-wave linear polarization light, the first color division light $Z^1$ is directed along an optical path zI, and the second color division light $Z^2$ is directed along an optical path zII;
    a first color synthesizing optical element configured to synthesize light from the optical path xI, the optical path yI, and the optical path zI into a first synthesized light and emit the first synthesized light;
    a second color synthesizing optical element configured to synthesize light from the optical path xII, the optical path yII, and the optical path zII into a second synthesized light and emit the second synthesized light;
    a first spatial modulation element configured to receive the first synthesized light and emit a first light image;
    a second spatial modulation element configured to receive the second synthesized light and emit a second light image, the second spatial modulation element being driven in conjunction with the first spatial modulation element;
    an optical image synthesizing mechanism configured to synthesize the first light image and the second light image into a synthesized light image and to emit the synthesized light image; and
    a synthesized light image projection element configured to project the synthesized light image; wherein:
    each frame of the synthesized light image is divided into a plurality of time periods and in each of the plurality of time periods two or more of the color light X, the color light Y, and the color light Z are configured to be projected simultaneously.

2. The light source device for a projector, according to claim 1, wherein:
    one of red light, green light and blue light corresponds to the color light X;
    one of red light, green light and blue light that does not correspond to the color light X, corresponds to the color light Y; and
    one of red light, green light and blue light that does not correspond to the color light X or the color light Y, corresponds to the color light Z.

3. The light source device according to claim 1, wherein:
    the first light source unit comprises:
        a first laser light source that emits the color light x,
        a first retardation plate mechanism configured to change the color light X into the first division light $X^1$ and the second division light $X^2$ in terms of time, and
        a first polarization beam splitter configured to direct the first color division light $X^1$ to the optical path xI and direct the second color division light $X^2$ to the optical path xII;
    the second light source unit comprises:
        a second laser light source that emits the color light Y,
        a second retardation plate mechanism configured to change the color light Y into the first division light $Y^1$ and the second division light $Y^2$ in terms of time, and
        a second polarization beam splitter configured to direct the first color division light $Y^1$ to the optical path yI and direct the second color division light $Y^2$ to the optical path yII; and
    the third light source unit comprises:
        a third laser light source that emits the color light Z,
        a third retardation plate mechanism configured to change the color light Z into the first division light $Z^1$ and the second division light $Z^2$ in terms of time, and
        a first polarization beam splitter configured to direct the first color division light $Z^1$ to the optical path zI and direct the second color division light $Z^2$ to the optical path zII.

4. The light source device according to claim 1, wherein:
    the optical image synthesizing mechanism is a polarization beam splitter.

5. The light source device according to claim 1, wherein:
    the each frame is divided into six time periods S1 through S6 which sequentially continue in terms of time;
    the first division color light $X^1$ enters the first spatial modulation element in the time periods S1 and S2 of the each frame;

the first division color light $Y^1$ enters the first spatial modulation element in the time periods S3 and S4 of the each frame;

the first division color light $Z^1$ enters the first spatial modulation element in the time periods S5 and S6 of the each frame;

the second division color light $Y^2$ enters the second spatial modulation element in the time periods S1 and S6 of the each frame;

the second division color light $Z^2$ enters the second spatial modulation element in the time periods S2 and S3 of the each frame; and the second division color light $X^2$ enters the second spatial modulation element in the time periods S4 and S5 of the each frame.

6. The light source device according to claim 5, wherein:

the first light source unit
  forms the first division color light $X^1$ in the time periods S1 and S2 of the each frame,
  is inactive in the time period S3 of the each frame,
  forms the second division color light $X^2$ in the time periods S4 and S5 of the each frame, and
  is inactive in the time period S6 of the each frame;

the second light source unit
  forms the second division color light $Y^2$ in the time period S1 of the each frame,
  is inactive in the time period S2 of the each frame,
  forms the first division color light $Y^1$ in the time periods S3 and S4 of the each frame,
  is inactive in the time period S5 of the each frame, and
  forms the second division color light $Y^2$ in the time period S6 of the each frame; and the third light source unit
  is inactive in the time period S1 of the each frame,
  forms the second division color light $Z^2$ in the time periods S2 and S3 of the each frame,
  is inactive in the time period S4 of the each frame, and
  forms the first division color light $Z^1$ in the time periods S5 and S6 of the each frame.

7. The light source device according to claim 5, wherein:

the first light source unit
  forms the first division color light $X^1$ in the time periods S1, S2 and S3 of the each frame, and
  forms the second division color light $X^2$ in the time periods S4, S5 and S6 of the each frame;

the second light source unit
  forms the second division color light $Y^2$ in the time periods S1 and S2 of the each frame,
  forms the first division color light $Y^1$ in the time periods S3, S4 and S5 of the each frame, and
  forms the second division color light $Y^2$ in the time period S6 of the each frame; and the third light source unit
  forms the first division color light $Z^1$ in the time period S1 of the each frame,
  forms the second division color light $Z^2$ in the time periods S2, S3 and S4 of the each frame, and
  forms the first division color light $Z^1$ in the time periods S5 and S6 of the each frame.

* * * * *